Patented July 6, 1926.

1,591,727

UNITED STATES PATENT OFFICE.

FERDINAND W. NITARDY, OF BROOKLYN, NEW YORK, ASSIGNOR TO E. R. SQUIBB AND SONS, OF NEW YORK, N. Y., A CORPORATION OF NEW YORK.

DENTIFRICE.

No Drawing. Application filed January 29, 1924. Serial No. 689,328.

This invention relates to dentifrices, and particularly to a non-injurious dentifrice which may be used freely without danger of abrading the enamel of the teeth.

Heretofore it has been considered essential to employ an abrasive material in powders and pastes intended for use in cleaning the teeth. The enamel coating of the teeth is relatively soft, and consequently attempts have been made to find soft abrasives, of which chalk is a common example, so that the danger of injuring the teeth is reduced. Other materials than chalk have been used and many of them have a very deleterious effect upon the teeth. Even the prolonged and frequent use of chalk or dentifrices including chalk will cause a certain amount of abrasion and may result in wearing away the enamel and especially exposed dentine of the teeth to an extent which will make them subject to decay. The search for suitable soft abrasives has continued for many years but no material which is markedly superior to chalk has been available heretofore.

It is the object of the present invention to provide a dentifrice in which the use of an abrasive is preferably avoided but which, nevertheless, can be used effectively to accomplish the purpose of abrasives without possible injury to the teeth.

In the search for a suitable material it was observed that animals and primitive peoples generally have well preserved teeth. This condition is ascribed to the use of coarse foods including a large proportion of vegetable material which must be thoroughly masticated. Apparently this vegetable material exercises a scrubbing action on the teeth without abrading the enamel and as a result the teeth are long preserved in their original and natural condition.

To accomplish the same result with a modern dentifrice abrasives should be excluded preferably and in place thereof the base of the dentifrice should be a material of vegetable origin in suitable form to permit of its application in the usual manner to the teeth. I have discovered that a suitable material for the purpose is structural cellulose in one or the other of its purified forms. The material is identified as structural to distinguish it from non-structural material, the original structure of which has been destroyed by the action of solvents or other media. Structural cellulose, for example, retains its original cell structure even though it is pulverized or impregnated. The material which I use is purified to remove mineral materials, coloring matter, resins, volatile oils and other impurities which would discolor or otherwise render the cellulose unfit for its intended purpose. The purification may be accomplished by the action of suitable solvents. Numerous forms of purified cellulose are available and methods of purifying it are well known.

A suitable purified cellulose is readily available in the form of the finer grades of paper pulp, the source of which may be any of the materials such as linen, cotton or wood fibre from which paper pulp is made. Cellulose from other sources and prepared by the removal of the impurities may be used instead of paper pulp. In employing the purified cellulose for the purpose of the present invention it should be dried and reduced to a powder. It can be combined then with antiseptic and flavoring materials and dispensed as a powder or with the addition of suitable liquids in the form of a paste. If it is desired to provide cellulose material of greater density than it would have otherwise, the material may be subjected to pressure before it is pulverized.

While I have described cellulose specifically as the preferred material to be used as the base of the dentifrice, other materials of vegetable origin and having similar characteristics may be substituted therefor. It is essential only that the material be structural in form, white or substantially white in color, and free from impurities and ingredients which would be injurious to the teeth. If a material is required which is harder than purified cellulose in its usual form this material may be impregnated with a solution of cellulose or other substance which will harden the cellulose base or otherwise modify and improve its quality as a scrubbing agent for the teeth. Cellulose is soluble, for example, in a number of volatile solvents and after impregnating the purified powdered cellulose the solvent can be evaporated, leaving a powder which is suitable for use in the dentifrice. The hardened cellulose can be combined with other materials to produce the dentifrice.

While it is desirable to exclude abrasive materials from the dentifrice, under some circumstances an abrasive may be useful and a dentifrice can be prepared by combining abrasive materials such as chalk with powdered structural cellulose. Various combinations of cellulose with such abrasives can be prepared. In such combinations the cellulose acts as a scrubbing agent and modifies the abrasive effect of constituents of an abrasive character.

While the invention relates more particularly to a dentifrice having as its base a purified cellulose material in structural form, it is to be understood that equivalent materials of vegetable origin may be substituted for the cellulose either alone or in combination with abrasives and with or without antiseptic and flavoring ingredients, the dentifrice being dispensed either as a powder or as a paste.

Various changes may be made in the ingredients and proportions of the dentifrice without departing from the invention or sacrificing any of the advantages thereof.

I claim:

1. A dentifrice including as its base a purified material of vegetable origin retaining its original cell structure, in a finely divided condition and substantially free from mineral and coloring matter, resins, volatile oils and other impurities.

2. A dentifrice including as its base purified structural cellulose retaining its original cell structure, in a finely divided condition and substantially free from mineral and coloring matter, resins, volatile oils and other impurities.

3. A dentifrice having as its base purified paper pulp in which the original cell structure of the source thereof is preserved, in a finely divided condition and substantially free from mineral and coloring matter, resins, volatile oils and other impurities.

In testimony whereof I affix my signature.

FERDINAND W. NITARDY.